July 5, 1949.  W. P. SCHROEDER  2,475,523
COOKER
Filed July 8, 1946  6 Sheets-Sheet 1

FIG-1

INVENTOR
WALTER P. SCHROEDER
BY *Adams and Bush*
Attorneys

July 5, 1949. W. P. SCHROEDER 2,475,523
COOKER
Filed July 8, 1946 6 Sheets-Sheet 2

INVENTOR
WALTER P. SCHROEDER
BY
Adams and Bush
Attorneys

July 5, 1949.  W. P. SCHROEDER  2,475,523
COOKER

Filed July 8, 1946  6 Sheets-Sheet 3

INVENTOR
WALTER P. SCHROEDER

BY
Adamson Bush
Attorneys

July 5, 1949. W. P. SCHROEDER 2,475,523
COOKER
Filed July 8, 1946 6 Sheets-Sheet 4

INVENTOR
WALTER P. SCHROEDER
BY
Adams and Bush
Attorneys

July 5, 1949.  W. P. SCHROEDER  2,475,523
COOKER

Filed July 8, 1946   6 Sheets-Sheet 6

INVENTOR
WALTER P. SCHROEDER

BY
Adams and Bush
Attorneys

Patented July 5, 1949

2,475,523

UNITED STATES PATENT OFFICE 2,475,523

COOKER

Walter P. Schroeder, Fort Lauderdale, Fla.

Application July 8, 1946, Serial No. 681,827

11 Claims. (Cl. 99—443)

This invention relates to food cooking apparatus and has more particular reference to automatic cookers of the type wherein the food is cooked in separate containers by a continuous process.

One object of the invention is to provide an automatic cooker which includes two cooking chambers through which a plurality of containers are continuously moved on a conveyor assembly employing an intermittent motion.

Another object of the invention is to provide an automatic cooker as characterized above, wherein improved means are provided for detachably suspending the containers from the conveyor and wherein the containers, which may or may not be foraminous, are provided with locking means to prevent lateral movement relative to the conveyor.

Another object of the invention is to provide an automatic cooker as characterized above, wherein at least one of the cooking chambers is provided with means for steaming the food.

Another object of the invention is to provide an automatic cooker as characterized above, wherein the two cooking chambers are connected by passageways and wherein means are provided for preventing the escape of heat from the chambers as the containers are moved into and through the chambers.

Another object of the invention is to provide an automatic cooker characterized as above, which includes means for automatically detaching a container filled with cooked food from the conveyor system and, at the same time, automatically attaching a container filled with uncooked food to the conveyor system.

Another object of the invention is to provide an automatic cooker as characterized above, including a casing or housing having aligned openings in its side walls for the insertion and removal of containers and wherein doors are provided for the openings with means for automatically raising and lowering the doors and wherein automatic means are provided for removing a container filled with cooked food and simultaneously inserting a container filled with uncooked food into the casing while the doors are raised.

Another object of the invention is to provide an automatic cooker as characterized above, wherein automatic timing means, including an interrupted gear system, is provided to control the cyclic operation of the aforementioned automatic means.

With the foregoing and other objects in view, the invention consists in the construction, combination and arrangement of parts hereinafter described and illustrated in the drawings, in which.

Referring now to the drawings, the automatic cooker comprises an upstanding housing or casing which is substantially rectangular and elongated in plan; the housing being made up of end walls 10 and 11, side walls 12 and 13, and bottom and top walls 14 and 15. If desired, the top, end and side walls may be suitably lined with asbestos or other heat insulating material 16. The housing is supported at each end by suitably attached legs 17.

The interior of the housing is divided into a lower cooking chamber or compartment 18 and an upper cooking chamber or compartment 19, connected at their front and rear ends by vertical passageways 20 and 21. The chambers and passageways are formed by means of horizontal partition walls 22 and 23 and vertical partition walls 24 and 25. Any suitable means may be provided for heating the cooking chambers 18 and 19; that illustrated in the present instance being one or more gas burners located beneath the chambers, as shown at 26.

The upper and lower cooking chambers, together with the front and rear vertical passageways connecting them, form a closed path of travel for an endless flexible chain conveyor system by means of which a plurality of separate food containers or buckets are continuously moved through the cooking chambers.

Suitable means are provided in each of the vertical passageways to prevent the escape of heat from the cooking chambers. In the particular embodiment shown, an upper pair of flaps 27, 28 and a lower pair of flaps 29, 30 are pivotally mounted within the front passageway 20 and an upper pair of flaps 31, 32 and a lower pair of flaps 33, 34 are pivotally mounted within the rear passageway 21. These flaps are hingedly mounted on the side walls of the passageways and are normally held in a horizontal closed position by suitable resilient means, such as springs 35. The flaps in the front passageway are adapted to open downwardly and the flaps in the rear passageway are adapted to open upwardly when engaged by a food container or bucket in its movement through the path of travel.

A transversely extending platform 36 is provided at the forward or exit end of the upper cooking chamber 19 and is preferably formed integral with the horizontal partition 23, which forms the bottom of the upper cooking chamber. The height of the platform is such as to slidably engage the bottoms of the buckets as they are moved over the platform. A transverse depending flap 37 is pivotally mounted on the top of the cooking chamber at a point located over the platform and is adapted to engage the forward upper portion of a bucket when in position on the platform and, together with the bucket, form a barrier to prevent the escape of heat from the cooking compartment, as shown in Fig. 1.

The lower cooking chamber 18 is adapted to be used either for frying or roasting food and, when used for frying, is filled with cooking oil or fat. A drain 38 is provided in one end of the bottom of the lower cooking chamber to permit draining the cooking oil or fat therefrom. If considered desirable, the bottom of the lower cooking chamber may be constructed to have a gradual slope toward the drain opening.

Means are provided in the lower cooking chamber for generating steam and comprises a closed container 39 mounted on the end wall of the chamber below the cooking oil level and having a water inlet 40. Steam outlets from the container 39 may be provided for both cooking chambers. In the particular embodiment shown, a steam outlet pipe 41 extends upwardly into the upper cooking chamber. By this arrangement, food, such as chicken, being fried in the lower cooking chamber, may be steamed in the upper cooking chamber while being subjected to the oven heat of the upper chamber.

Figure 1:
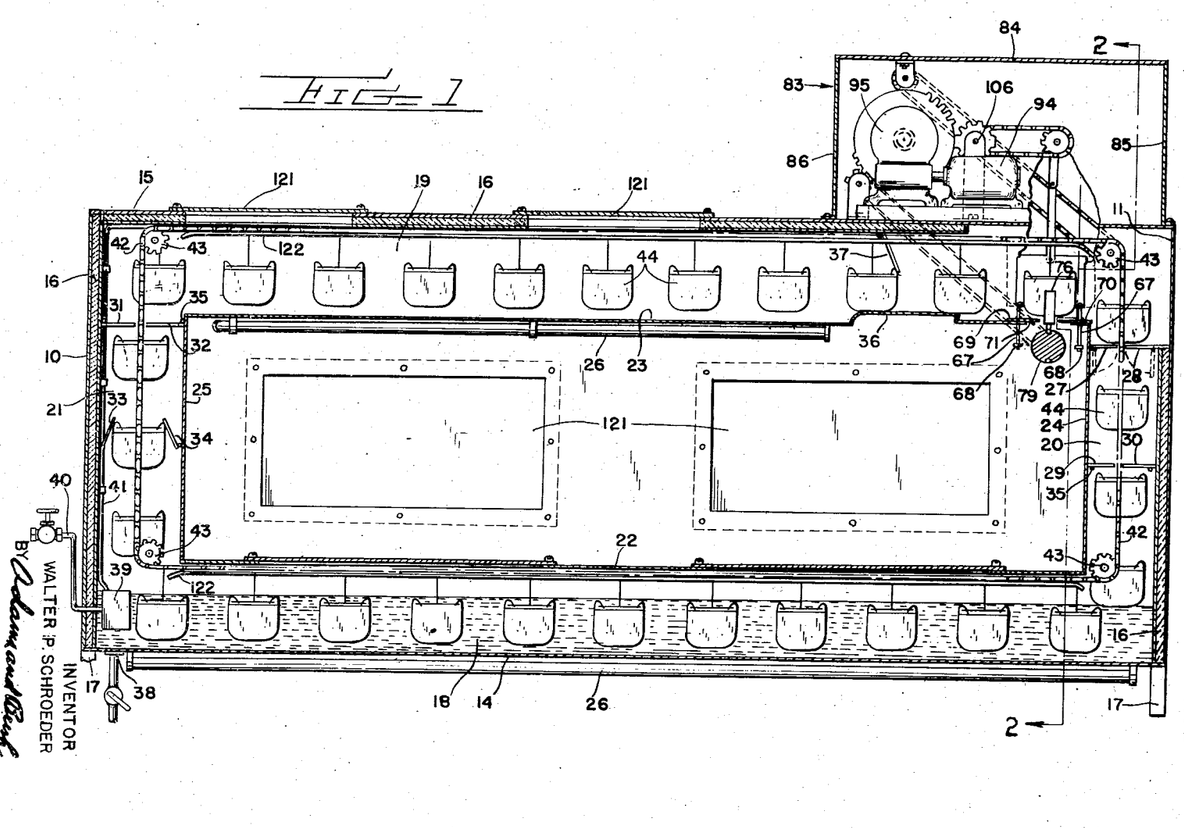
Fig. 1 is a vertical sectional view of the automatic cooker.
Figure 2:
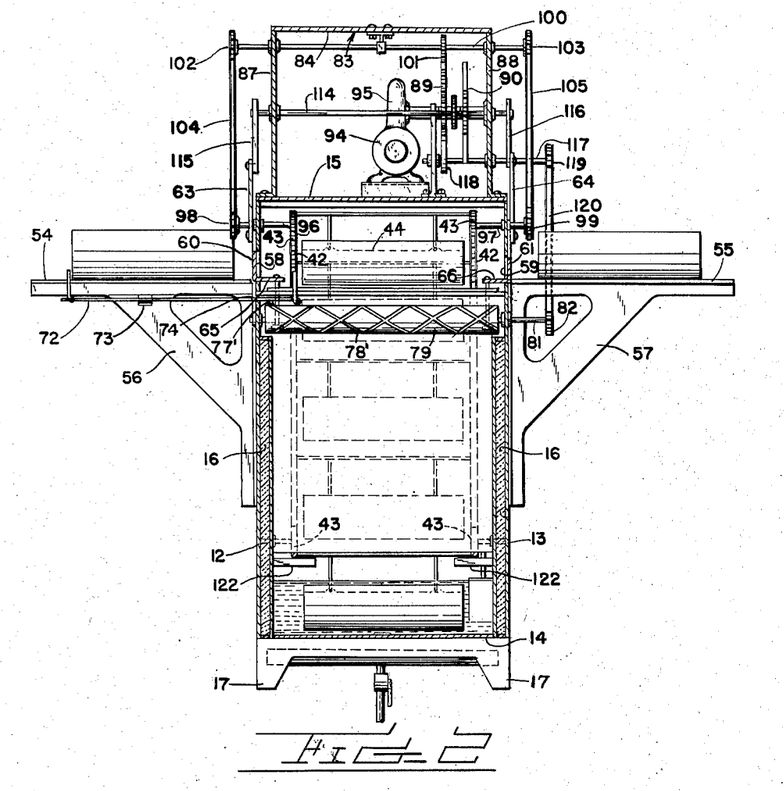
Fig. 2 is a vertical sectional view taken on the line 2—2 of Fig. 1.
Figure 3:
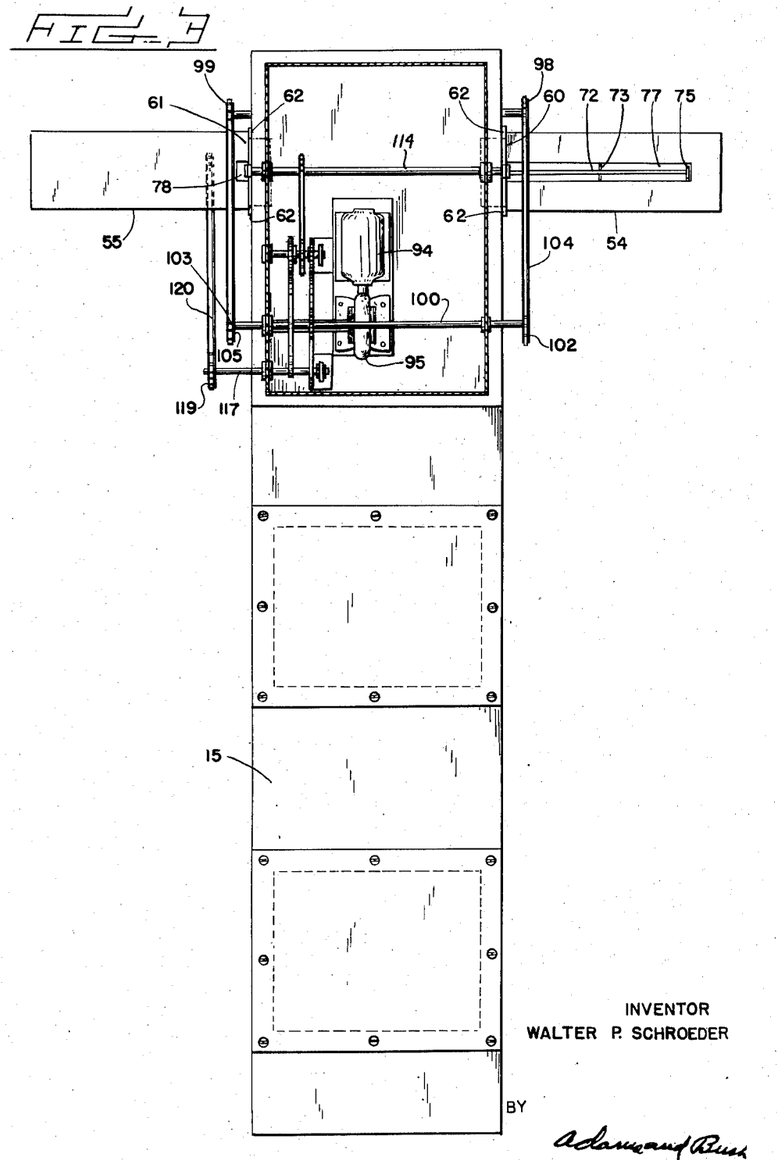
Fig. 3 is a plan view of the automatic cooker shown in Fig. 1.
Figure 4:
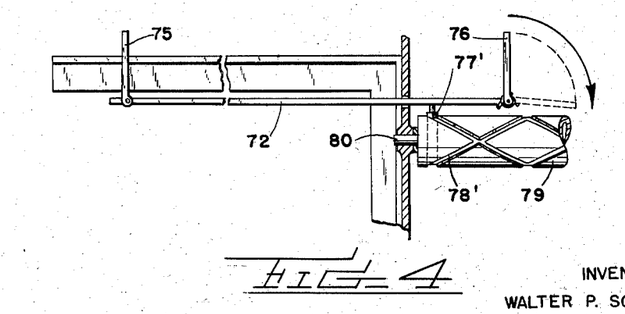
Fig. 4 is an enlarged detail view of the loading and unloading mechanism shown in Fig. 2.

The endless chain conveyor system comprises a spaced pair of endless flexible members or chains 42 mounted on and engaging spaced pairs of sprockets 43 rotatably mounted on brackets suitably secured to the side walls of the housing, as shown in Figs. 1 and 2.

A plurality of containers or buckets 44 are detachably mounted on the pair of endless chains. The buckets 44 are of identical construction and each comprises a hollow rectangular member having end walls 45, 46 and side walls 47, 48. The side walls 47, 48 extend above the end walls and their upper edge portions are bent inwardly and downwardly, and the lower edge of the downwardly bent portion is provided with a pair of spaced notches or cut out portions 49. The buckets may be made foraminous by forming the bottom, end and side walls with a plurality of apertures therein.

Figure 9:
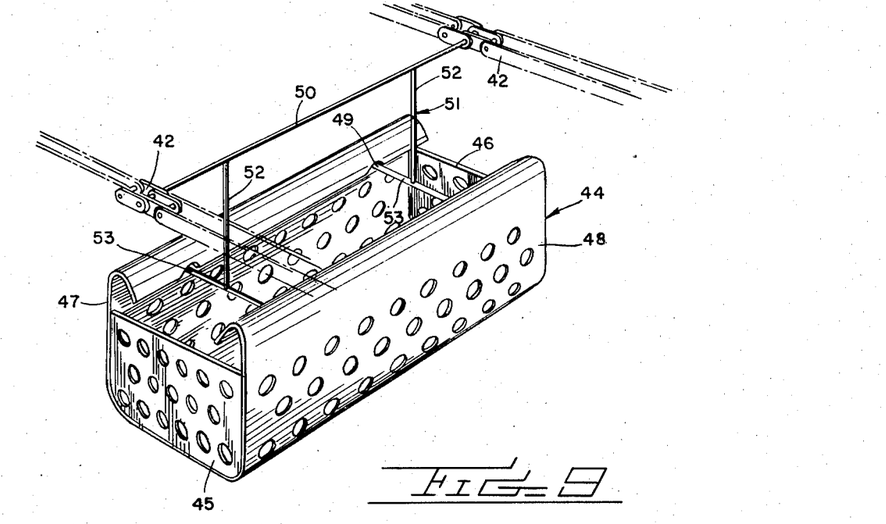
Fig. 9 is a perspective view of a carrier, showing the manner in which it is attached to the conveyor chains.
Figure 10:
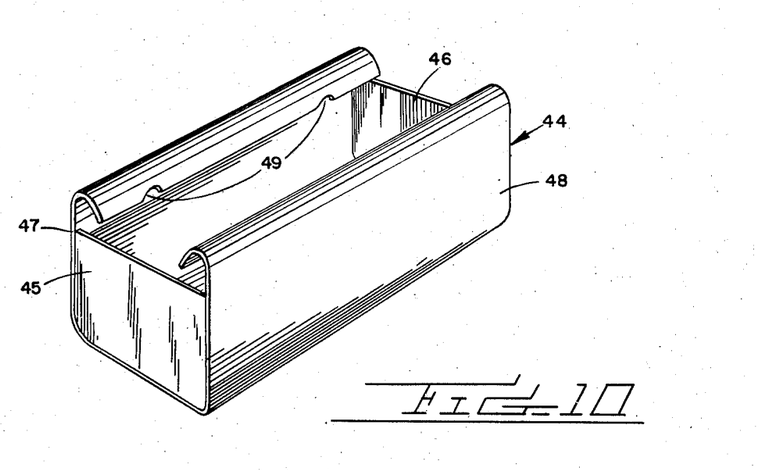
Fig. 10 is a perspective view of a modified form of carrier.

The endless chains are provided at predetermined spaced intervals with a plurality of means for detachably supporting a carrier or bucket. Each of the means is of identical construction and comprises a horizontal rod or supporting member 50 extending between the chains and having its ends rotatably journaled in links of the chain, as clearly shown in Fig. 9. Each horizontal rod 50 is provided, intermediate its ends, with a spaced pair of depending, inverted, T-shaped hooks or members 51 formed integral therewith or suitably secured thereto, as by welding. Each of the depending, inverted, T-shaped members comprises a vertical rod or member 52 having a horizontally extending rod or member 53 attached to its end, as by welding, the point of attachment being located intermediate of the ends of the rod 53. The rods 53 extend parallel to each other and at right angles to the horizontal rod 50.

When the carriers or buckets 44 are attached to the conveyor, the ends of the rods 53 are received in the notches 49, which act as detents or locking means to prevent lateral movement of the buckets. The buckets are automatically attached and detached to and from the conveyor chains in a manner hereinafter to be described.

A loading and unloading station is located in the path of travel of the conveyor, at which means are provided for automatically detaching from the conveyor a bucket or carrier containing cooked food and simultaneously attaching to the conveyor a bucket or carrier filled with food to be cooked. The loading station is located in the upper forward portion of the housing and includes a pair of fixed platforms 54, 55 on each side of the housing, supported by brackets 56, 57. Openings 58, 59 are formed in the side walls of the housing in alignment with the platforms. The openings 58, 59 are provided with vertical sliding doors 60, 61 engaging in vertical guideways 62 formed on the sides of the openings. Pivotally attached levers 63, 64 are provided for raising and lowering the doors. The doors are raised and lowered in a manner and by means hereinafter to be described.

Each of the doors 60, 61 has an integral inwardly turned flange 65, 66 formed on its bottom edge. A spaced pair of depending rods 67, having abutments 68 formed on their ends are fixedly attached to each of the flanges 65, 66, each rod being located adjacent to one end of the flange. A spaced pair of platform members 69, 70 are slidably mounted on the rods, with one rod on one door passing through an opening in one end of the platform member while the corresponding aligned rod on the opposite door passes through an opening in the opposite end of the platform.

When the doors are in their lowered positions, the platform members 69, 70 rest on the edges of a transversely extending opening 71 formed in the horizontal partition 23 which forms the bottom of the upper cooking chamber with the rods 67 projecting through suitable openings formed in the partition 23. When the doors are lifted to their "raised" positioned the abutments on the depending rods 67 will engage and raise the movable platform members 69, 70 and support them in horizontal alignment with the upper surface of the fixed platforms 54, 55. Thus, when a bucket is brought, by the chain conveyor, to a position straddling the platform members 69, 70, as shown in Fig. 1, the bucket will be raised by the platform members, when they are raised, to a position from which it can be pushed through the opening in the side wall of the housing onto the fixed platform 55. When in this raised position, the notches 49 formed in the bucket are freed from engagement with the ends of the rods 53 and the bucket is detached from the chain conveyor and is free to be pushed out of the opening in the side wall of the housing.

The mechanism for pushing the bucket filled with cooked food from the movable platform members 69, 70 onto the fixed platform 55 and, at the same time, pushing a bucket filled with food to be cooked from the fixed platform 54 onto the movable platform members 69, 70, includes an elongated member or rod 72 supported by a bracket 73 depending from the fixed platform 54 and a bearing 74 formed in the side wall of the housing. The rod 72 is provided, adjacent each end, with vertical projections or fingers 75, 76 hingedly connected thereto and normally held in upright position by suitable springs. The finger 75 extends upwardly within a slot 77 formed in the fixed platform 54. A slot 78, formed in the fixed platform 55, is adapted to receive the finger 76 when the rod 72 is moved to the right, as viewed in Fig. 2.

Depending from the rod 72 at a point spaced inwardly of the finger 76 is a cam follower 77' adapted to ride in a cam track 78' formed on the outer surface of a cylinder 79 fixedly mounted on a shaft 80 rotatably mounted in suitable bearings formed in the side walls of the housing. As the cylinder 79 rotates, the cam follower 77' riding in the cam track 78', will cause the rod 72 to reciprocate. The length of the rod 72 and the spacing of the upright fingers 75, 76 are so constructed and arranged that, as the rod 72 moves from its extreme left position to its extreme right position, as viewed in Fig. 2, the finger 76 will engage the bucket on the movable platform members 69, 70 and push it through the opening in the side wall of the housing onto the fixed platform 55 at the same time the finger 75 engages a bucket filled with food to be cooked and pushes it from the fixed platform 54 through the opening formed in the other side wall of the housing onto the movable platform members 69, 70.

As the rod 72 moves back from its extreme right position to its extreme left position, the fingers 75, 76 will be pivoted into horizontal position as they engage and slide under the buckets on the movable platform members 69, 70 and the fixed platform 54 and will spring back to vertical position as soon as they have moved clear of the buckets.

The right hand end 81 of the shaft 80 extends through the side wall of the housing and has a sprocket 82 fixedly mounted thereon. The sprocket 82 is intermittently driven by an endless chain in a manner and by means hereinafter to be described.

A housing 83 for the driving mechanism is suitably secured on the upper forward end of the cooker housing and comprises top wall 84, end walls 85, 86 and side walls 87, 88. The driving mechanism includes a spaced pair of interrupted gears 89, 90, each having a series of gear teeth 91, 92 located 180° apart relative to each other. The gears 89, 90 are fixedly mounted on a shaft 93, mounted in suitable bearings in the housing 83 and driven by a motor 94 through suitable reduction gearing 95. The upper forward pair of sprockets 43, on which the conveyor chains 42 are mounted, are fixedly attached to stub shafts 96, 97, which are mounted in suitable bearings in the side walls 12, 13 of the cooker housing. The shafts 96, 97 project through the side walls and sprockets 98, 99 are fixedly attached to their outer ends. A shaft 100, mounted in suitable bearings in the housing 83, has an interrupted gear 101 fixedly mounted thereon and positioned to engage and be driven by the interrupted gear 89. Sprockets 102, 103 are fixedly mounted on each end of the shaft 100 and, by means of endless chains 104, 105, drive the sprockets 98, 99 and, through them, the endless conveyor chains 42.

A shaft 106, mounted in suitable bearings in the housing 83, has a spaced pair of interrupted gears 107, 108 loosely mounted thereon and positioned to engage and be driven by the interrupted gears 89, 90, respectively. The gear 107 drives the shaft 106 through an over-riding clutch 109, fixedly mounted on the shaft 106 and gear 108 drives the shaft 106 through an over-riding clutch 110 fixedly mounted on the shaft 106.

A sprocket 111 is fixedly mounted on the shaft 106 intermediate the over-riding clutches 109, 110 and, by means of an endless chain 112, drives a sprocket 113 fixedly mounted on a shaft 114 suitably mounted in bearings formed in the side walls of the housing 83. The ends of the shaft 114 project beyond the side walls of the housing 83 and each end has a crank arm 115, 116 fixedly attached thereto. The levers 63, 64 are pivotally connected at one end to the bottom ends of the crank arms 115, 116, respectively, and, at their other ends are pivotally connected to the sliding doors 60, 61, respectively; thus, as the shaft 114 rotates, the doors are raised and lowered.

A shaft 117, mounted in suitable bearings in the housing 83, has an interrupted gear 118 fixedly mounted thereon and positioned to engage and be driven by interrupted gear 89. One end of shaft 117 projects beyond the side wall of the housing 83 and has a sprocket 119 fixedly mounted thereon, which drives, by means of an endless chain 120, the sprocket 82 and the cam cylinder 79, thus causing the rod 72 to reciprocate.

The cyclic operation of the apparatus is diagrammatically shown in Figs. 6, 7, 8 and 9. Assuming that all the buckets are filled with food, with the bucket positioned at the loading station filled with completely cooked food and ready to be detached from the conveyor system and a new bucket filled with uncooked food in position on the fixed platform 54:

*1st cycle (Fig. 5)*

Figures 5, 6:
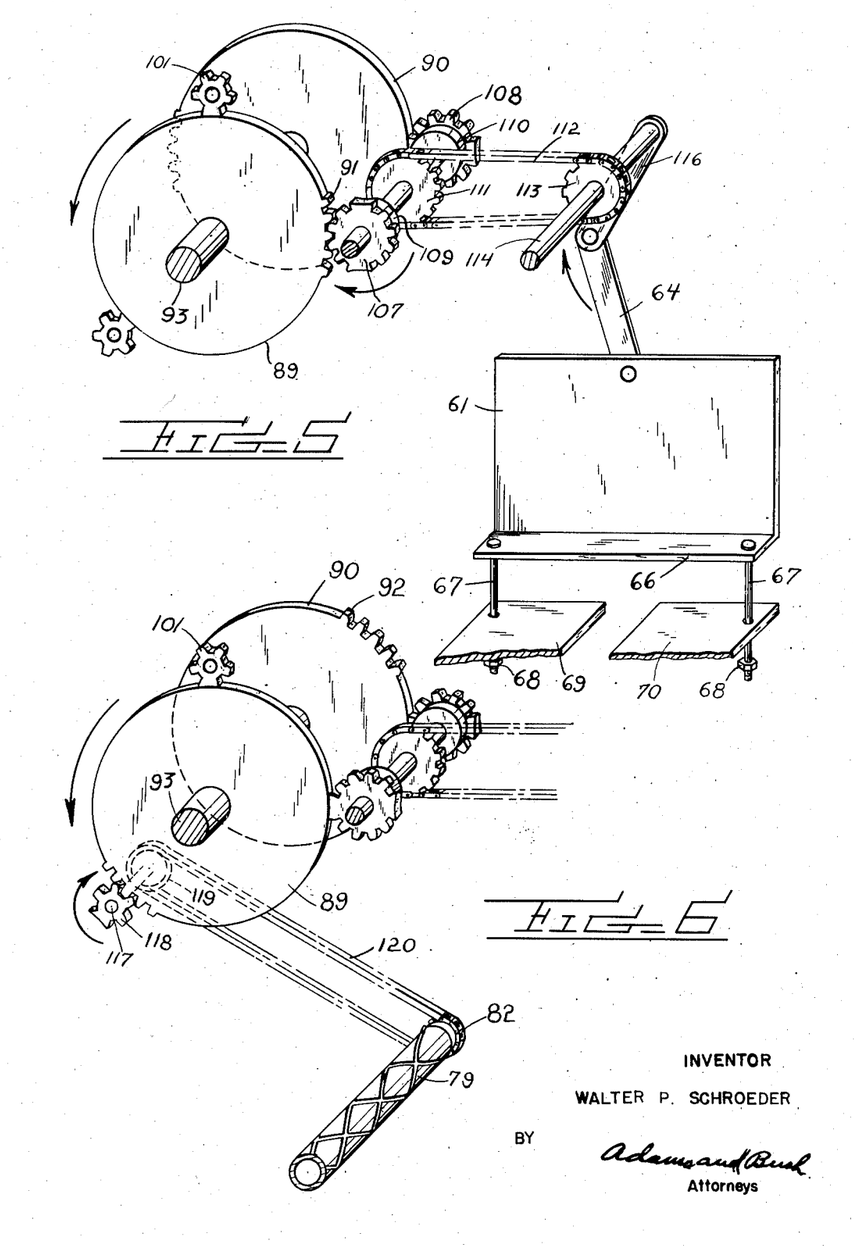
Fig. 5 is a diagrammatic view showing the first cycle of operation controlled by the interrupted gear drive.
Fig. 6 is a diagrammatic view showing the second cycle of operation controlled by the interrupted gear drive.

As shaft 93, driven by the motor, rotates, the gear teeth 91 on interrupted gear 89 engage the interrupted gear 107, which, through the over-riding clutch 109, drives the shaft 106 and the sprocket 111, which, in turn, by means of endless chain 112, rotates the shaft 114, thereby causing the crank arms 115, 116 and levers 63, 64 to raise the doors 60, 61.

*2nd cycle (Fig. 6)*

As shaft 93 continues to rotate, the gear teeth 91 on interrupted gear 89 engage the interrupted gear 118 on shaft 117, thereby rotating the shaft 117 and the sprocket 119, which, by means of endless chain 120, drives the sprocket 82 and the cam cylinder 79 to reciprocate the rod 72. As the rod 72 moves to the right, the bucket filled with cooked food is pushed onto the fixed platform 55 while, at the same time, a bucket filled with food to be coked is moved from the fixed platform 54 onto the movable platform members

69, 70. As the cam cylinder 79 continues to rotate, the rod 72 is moved to the left to its former starting position.

Figures 7, 8:
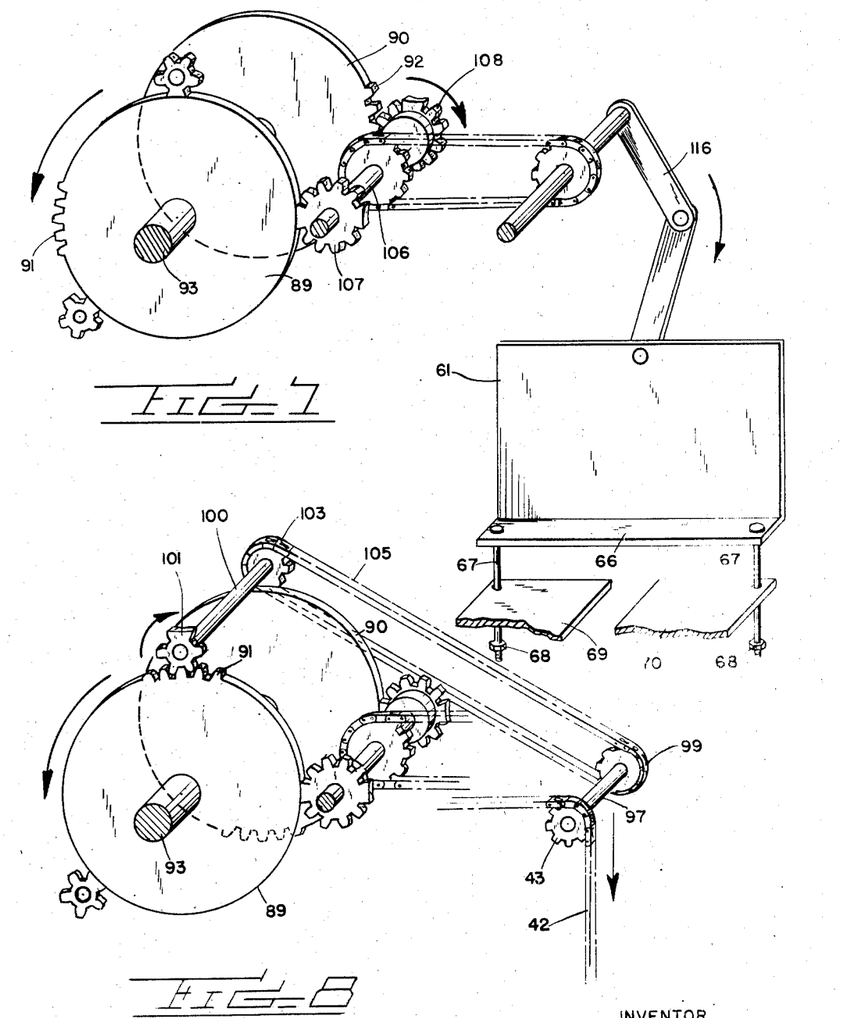
Fig. 7 is a diagrammatic view showing the third cycle of operation controlled by the interrupted gear.
Fig. 8 is a diagrammatic view showing the fourth cycle of operation controlled by the interrupted gear.

3rd cycle (Fig. 7)

As shaft 93 continues to rotate, the gear teeth 92 on interrupted gear 90 engage the interrupted gear 108, which, through over-riding clutch 110, drives the shaft 106 and the sprocket 111, which, in turn, by means of endless chain 112, rotates the shaft 114, thereby causing the crank arms 115, 116 and the levers 63, 64 to lower the doors 60, 61.

During all of the preceding cycles, the conveyor chains 42 have remained stationary.

4th cycle (Fig. 8)

As shaft 93 continues to rotate, the gear teeth 91 on interrupted gear 89 engage the interrupted gear 101 on shaft 100, thereby rotating the shaft 100 and the sprockets 102, 103, which, by means of endless chains 104, 105, drive the sprockets 98, 99 and the endless conveyor chains 42. The conveyor chains 42 move through a distance to bring the next bucket onto the loading station, whence the cycles are repeated.

The number and spacing of the buckets carried by the conveyor are predetermined, together with the size and arrangement of the gears, and the timing, so that a bucket filled with uncooked food is loaded onto the conveyor system and intermittently moved through the lower and upper cooking chambers and brought onto the unloading platform at the exact time the food contained therein is perfectly cooked. Obviously, the timing and other arrangements may be altered to properly cook varying types of food.

The spacing of the buckets and the spacing of the upper and lower heat retaining flaps in the front and rear vertical passageways is such that, when one of the pairs of flaps in a passageway is engaged and opened by a bucket, the other pair of flaps is closed; thus the spaced pairs of flaps act as a heat lock.

Suitable openings covered by detachable closure members 121 may be provided in the top and side walls of the cooker housing and the top of the lower cooking chamber to provide access to the interior of the cooker for cleaning purposes. Also, if desired, means may be provided for guiding and supporting the endless chains 42 during their long horizontal reaches between the front and rear pairs of sprockets 43; in the particular embodiment shown, supporting plates 122, suitably secured to the side walls of the housing, are provided for this purpose.

Obviously, the invention is not restricted to the particular embodiment thereof herein shown and described. Moreover, it is not indispensable that all the features of the invention be used conjointly, since they may be employed advantageously in various combinations and sub-combinations.

What is claimed is:

1. Apparatus for cooking edibles comprising a housing having a cooking chamber formed therein; means for heating said chambers; an endless conveyor mounted in said housing; a plurality of food containers detachably connected to said conveyor; automatic driving means for moving said conveyor in a closed path within said housing and through said cooking chamber; a loading and unloading station formed in said housing; and means carried by said housing and located at said station for automatically detaching a container from the conveyor, removing it from the housing and inserting a container into the housing and attaching it to the conveyor, said means including vertically movable platform members adapted to be raised into position to engage and lift and detach a container from said conveyor; a reciprocatory member provided with spaced stop members, one of said stop members being positioned to engage and remove a container after it has been detached from the conveyor and the other of said stop members being positioned to engage and move an unattached container onto said platform members into a position whereby when said platform members are lowered the unattached container will be attached to said conveyor; and driving means for intermittently operating said platform members and said reciprocatory member.

2. Apparatus for cooking edibles comprising a casing having top, bottom and side walls, horizontal and vertical partitions therein providing a closed path including upper and lower compartments connected at their front and rear ends by vertical passageways; means for heating said compartments; an endless conveyor having a path of movement through said closed path; a plurality of spaced buckets detachably connected to and movable with said conveyor; automatic means including translatory members mounted for reciprocatory movement in a fixed path and located at a predetermined point in the path of movement of said conveyor for detaching and attaching buckets to and from the conveyor; automatic means including a reciprocatory member carrying a spaced pair of stop members for engaging and removing a detached bucket from within the casing and simultaneously engaging and moving a bucket to be attached into the casing; automatic driving means for intermittently moving said conveyor; and timing means controlling the operation of said automatic means whereby their sequence of operation will be automatic detachment of a bucket from the conveyor, automatic removal of the detached bucket from the casing simultaneously with insertion of a bucket into the casing, automatic attachment of the last named bucket to the conveyor, forward movement of the conveyor to advance another bucket to the predetermined point, thence repetition of above cycle.

3. An apparatus, as set forth in claim 2 wherein said side walls are provided with opposed openings having vertical edges provided with guideways having doors slidably mounted therein and wherein said automatic means for detaching and attaching buckets to the conveyor includes means for automatically opening and closing said doors.

4. An apparatus, as set forth in claim 2, wherein said timing means includes an interrupted gear system.

5. An apparatus, as set forth in claim 2, wherein said automatic means for removing a detached bucket from within the casing and simultaneously moving a bucket into the casing includes a reciprocating member provided with a cam follower and a rotary cylindrical member provided with a cam track adapted to receive said cam follower.

6. Apparatus, as set forth in claim 2, wherein said conveyor is provided with a plurality of spaced supporting members having depending hook-like members attached thereto upon which the buckets are suspended and wherein said automatic means for attaching and detaching a bucket to and from the conveyor includes movable platform members adapted to engage the bottom of a bucket and raise or lower it to detach or attach it to the hook-like members.

7. Apparatus for cooking edibles comprising a housing having a cooking chamber formed therein; means for heating said chamber; an endless conveyor mounted within said housing and having a path of movement through said chamber, said conveyor including a laterally spaced oppositely disposed pair of endless flexible members having a plurality of spaced carrier members mounted thereon, each of said carrier members including a supporting member extending between and having its ends journaled in said flexible members and having a spaced pair of depending inverted T-shaped members attached thereto intermediate its ends; a plurality of buckets carried by said conveyor, each of said buckets having a bottom, side and end walls, said side walls extending above said end walls and being provided with means adapted to engage the ends of the inverted T-shaped member of a carrier member whereby each of said buckets is supported by a carrier member.

8. Apparatus for cooking edibles, as set forth in claim 7, wherein said means consists of inwardly and downwardly projecting flanges formed along the tops of said side walls and wherein each of said flanges is provided with a spaced pair of notches adapted to receive the ends of the inverted T-shaped members of a carrier and act as detents to prevent lateral movement of said bucket relative to said carrier.

9. Apparatus for cooking edibles comprising a housing, horizontal and vertical partitions therein providing an upper cooking compartment and a lower cooking compartment connected at their front and rear ends by vertical passageways; means for heating the upper and lower compartments; an endless conveyor having a closed path of movement through the upper and lower compartments and said passageways; a plurality of spaced buckets connected to and movable with said conveyor; automatic driving means for moving said conveyor; vertically spaced pairs of flaps mounted in each of said passageways and normally held in their closed position to prevent the escape of heat from the upper and the lower compartments, said flaps being engageable by said buckets and moved thereby to their open position, the distance between the upper pairs of flaps and the lower pairs of flaps and the spacing of said buckets being such that when one pair of flaps in a passageway is engaged and opened by a bucket the other pair of flaps in the passageway remains closed.

10. Apparatus for cooking edibles, as set forth in claim 9 wherein said buckets are intermittently moved through the closed path and wherein means are provided to prevent the escape of heat from the upper compartment including a transverse raised platform formed adjacent to the exit end thereof upon which a bucket comes to rest after each intermittent movement, and a depending plate pivotally mounted in said compartment and adapted to engage a bucket when positioned on said platform.

11. Apparatus for cooking edibles comprising a housing, horizontal and vertical partitions therein providing upper and lower cooking compartments connected at their forward and rear ends by vertical passageways; said lower compartment being adapted to contain heating cooking oil to a predetermined level; means for heating said compartments; a device for generating steam mounted in said lower compartment in heat exchange relation with the cooking oil, said device including a closed container having a water inlet and a steam outlet opening into the upper compartment and adapted to discharge steam therein; an endless conveyor having a path of movement through said chambers and said passageways; a plurality of food containers connected to and movable with said conveyor; and automatic driving means for moving said conveyor whereby the food contained in said containers will be fried in the lower compartment and steamed in the upper compartment.

WALTER P. SCHROEDER.

REFERENCES CITED

The following references are of record in the file of this patent:

UNITED STATES PATENTS

| Number | Name | Date |
| --- | --- | --- |
| 1,419,756 | Putnam et al. | June 13, 1922 |
| 1,596,606 | Fooks | Aug. 17, 1926 |
| 2,013,906 | Boiardi | Sept. 10, 1935 |
| 2,097,471 | Scharsch | Nov. 2, 1937 |
| 2,112,309 | Santillan | Mar. 29, 1938 |
| 2,253,567 | Kochenour et al. | Aug. 26, 1941 |
| 2,369,274 | Beatty | Feb. 13, 1945 |